United States Patent
Rueger et al.

(10) Patent No.: US 10,040,963 B2
(45) Date of Patent: Aug. 7, 2018

(54) ELECTRICALLY CONDUCTIVE PIGMENT

(71) Applicant: Merck Patent GmbH, Darmstadt (DE)

(72) Inventors: Reinhold Rueger, Roedermark (DE); Bjoern Kleist, Gimbsheim (DE)

(73) Assignee: Merck Patent GmbH, Darmstadt (DE)

( * ) Notice: Subject to any disclaimer, the term of this patent is extended or adjusted under 35 U.S.C. 154(b) by 77 days.

(21) Appl. No.: 15/035,020

(22) PCT Filed: Oct. 14, 2014

(86) PCT No.: PCT/EP2014/002771
§ 371 (c)(1),
(2) Date: May 6, 2016

(87) PCT Pub. No.: WO2015/067337
PCT Pub. Date: May 14, 2015

(65) Prior Publication Data
US 2016/0272837 A1    Sep. 22, 2016

(30) Foreign Application Priority Data

Nov. 7, 2013 (EP) .................... 13005255

(51) Int. Cl.
| | | |
|---|---|---|
| C09D 11/00 | (2014.01) |
| C09D 17/00 | (2006.01) |
| C09D 7/12 | (2006.01) |
| C09C 1/00 | (2006.01) |
| H01B 1/08 | (2006.01) |
| C09D 5/24 | (2006.01) |
| C09D 101/02 | (2006.01) |
| H01B 13/00 | (2006.01) |
| C08K 3/00 | (2018.01) |
| C08K 3/22 | (2006.01) |
| C08K 3/34 | (2006.01) |
| C08K 9/10 | (2006.01) |

(52) U.S. Cl.
CPC .......... C09D 17/007 (2013.01); C09C 1/0021 (2013.01); C09D 5/24 (2013.01); C09D 7/1225 (2013.01); C09D 7/1291 (2013.01); C09D 101/02 (2013.01); H01B 1/08 (2013.01); H01B 13/0033 (2013.01); C01P 2002/54 (2013.01); C01P 2004/51 (2013.01); *C01P 2006/40* (2013.01); *C08K 3/0033* (2013.01); *C08K 3/22* (2013.01); *C08K 3/346* (2013.01); *C08K 9/10* (2013.01)

(58) Field of Classification Search
CPC ......... C09C 1/0015; C09C 1/405; C09C 1/36; C09C 11/00; B82Y 30/00
USPC ................... 252/519.4, 520.1; 106/31.6, 415
See application file for complete search history.

(56) References Cited

U.S. PATENT DOCUMENTS

| | | | |
|---|---|---|---|
| 4,457,130 A | 7/1984 | Sakai et al. | |
| 4,568,609 A | 2/1986 | Sato et al. | |
| 5,322,561 A * | 6/1994 | Prengel ................. | B82Y 30/00 106/415 |
| 5,472,640 A | 12/1995 | Bruckner et al. | |
| 2010/0258769 A1* | 10/2010 | Krietsch ............... | C09C 1/0015 252/519.4 |
| 2013/0244022 A1 | 9/2013 | Rueger et al. | |
| 2013/0248781 A1* | 9/2013 | Rueger .................. | C09C 1/405 252/520.1 |

FOREIGN PATENT DOCUMENTS

| | | | | |
|---|---|---|---|---|
| DE | 3237990 A1 | 8/1983 | | |
| DE | 3842330 A1 | 6/1990 | | |
| DE | 4237990 A1 | 5/1994 | | |
| DE | 102005018615 A1 | 12/2005 | | |
| EP | 0139557 A1 | 5/1985 | | |
| EP | 0359569 B1 | 3/1997 | | |
| EP | 0743654 B1 | 1/2000 | | |
| JP | 2005-336485 | * | 12/2005 | ............... C09C 1/36 |
| WO | 2012/072174 A1 | 6/2012 | | |

OTHER PUBLICATIONS

International Search Report dated Jan. 28, 2015 issued in corresponding PCT/EP2014/002771 application (pp. 1-2).
English Abstract of DE 4237990 A1 published May 19, 1994.
English Abstract of DE 102005018615 A1 published Dec. 8, 2005.

* cited by examiner

*Primary Examiner* — Khanh Tuan Nguyen
(74) *Attorney, Agent, or Firm* — Millen White Zelano and Branigan, PC; Csaba Henter

(57) ABSTRACT

The present invention relates to electrically conductive pigments, to a process for the preparation thereof and to the use thereof, in particular in antistatic or dissipative articles or surfaces, for example in paints, coatings, printing inks or floorcoverings.

20 Claims, No Drawings

ELECTRICALLY CONDUCTIVE PIGMENT

The present invention relates to electrically conductive pigments, to a process for the preparation thereof and to the use thereof, in particular in antistatic or dissipative articles or surfaces, for example in paints, coatings, printing inks or floorcoverings.

In areas in which static charges of articles or surfaces can arise due to friction and whose energy can be released in the form of electrical discharges, dissipative surfaces are urgently required and are usually also employed as standard. Static charges generally arise due to friction of different materials against one another. Sudden discharge of the static charges may cause both damage to technical equipment and also personal injuries. A frequent form of electrostatic charge arises due to simple walking on flooring. This may result in charging of shoe soles, the people themselves or the floor surface and cause noticeable spark discharge, which may result in damage to equipment and installations located in the room. Such discharges have severe consequences, for example in operating rooms, in rooms with sensitive electronics or in areas in which explosive gases or dusts may be released.

It is therefore good standard to provide at-risk areas and equipment with antistatic coatings or an antistatic finish. For example, plastics, fibres and fabrics, but in particular floorcoverings in a very wide variety of areas, are provided with an antistatic finish. To this end, electrically conductive pigments, which facilitate rapid dissipation of the charge formed given corresponding earthing, are often incorporated into the corresponding materials.

As a measure of the ability to be able to dissipate static discharges is the dissipative capacity. The level of the dissipative capacity is determined in accordance with the electrical resistance of the respective material, measured in ohms. The higher the electrical resistance, the lower the dissipative capacity of the corresponding material. For industrial applications or floorcoverings, however, the electrical resistance should not be unlimitedly low, since direct electrical conductivity of the corresponding materials is generally neither necessary nor desired. Instead, the electrical dissipative capacity of, for example, floorcoverings should be set in such a way that, although electrostatic charging is prevented, people do not, however, suffer any body-injuring current flow in the case of simultaneous contact of voltage sources and floorcovering. A guide value of the dissipative capacity of floorcoverings is generally a resistance of $\leq 10^9$ ohm.

Although carbon black or graphite are currently often employed as electrically conductive pigments for establishing the dissipative capacity in materials and surface finishes of objects, electrically conductive pigments based on transparent flake-form substrates have already been known for some time. The latter frequently consist of mica and have on their surface a coating of an electrically conductive material, frequently antimony-doped tin oxide. In contrast to carbon black and graphite, which impart a dark to black colour on the materials provided therewith and are of only limited suitability for mixing with other colorants, the mica-based electrically conductive pigments can also be employed in pale coatings and combined with various colorants. Depending on the particle size and layer structure of the pigments, it may even be possible to achieve completely or partially transparent application media having a pale or chromatic colour.

For example, pigments based on mica which are coated either only with a layer of $(Sb,Sn)O_2$ or alternatively with a layer system comprising $TiO_2/(Sb,Sn)O_2$ are commercially available under the names Minatec® 31 CM or Minatec® 30 CM (products from Merck KGaA).

In other embodiments, the substrates employed are mica flakes in a mixture with spherical quartz particles, where the two substrates are preferably used in a ratio of 1:1. The conductive coating here likewise consists of antimony-doped tin oxide. These pigments result in a comparatively high dissipative capacity in application media provided therewith, but are not very suitable for use in particularly thin coatings since the spherical constituents result in roughening of the corresponding surface.

The electrically conductive pigments based on mica that are sold by Merck KGaA are described, for example, in the patents DE 38 42 330, DE 42 37 990, EP 0 139 557, EP 0 359 569 or EP 0 743 654.

DE 10 2005 018615 discloses flake-form conductive pigments having high transparency. These pigments have an average particle area of 150 $\mu m^2$ or more and are very highly suitable, in particular, for use in highly transparent plastic articles, conductive decorations and clear coats. For applications which require a higher hiding power, for example for pale finishes on dark backgrounds, however, these pigments are less suitable.

The electrically conductive pigments mentioned above have in common the disadvantage that they either do not give rise to satisfactory electrically conductive properties or do not give rise to satisfactory optical properties in thin layers, in the form, for example, of paint coats or printed layers, or in some cases have absolutely no efficacy with respect to the electrical dissipative capacity.

The layer thicknesses of primer coats, for example primer coats on plastic parts, are frequently only 20 $\mu m$, in the case of printed layers even often below 10 $\mu m$. On use of the electrically conductive pigments mentioned above, very high pigment concentrations are often necessary here in order to be able to achieve electrical conductivity of the layer at all, since the use concentration at which the coating as such becomes electrically conductive is dependent both on the layer thickness of the coating and also on the pigment concentration of the electrically conductive pigments in the coating material or printing ink. Thus, a lower layer thickness must be compensated by a higher pigment concentration, which often results in mechanical defects during processing of the coating composition due to excessively high viscosity or alternatively in deficient physical-mechanical properties of the coatings obtained. It is also difficult to produce low electrical resistance values of <10E+05 ohm in the case of very thin layer thicknesses, i.e. below 15 $\mu m$.

If, however, coarse electrically conductive pigments or also finely divided mixtures of flake-form and spherical particles are employed for thin layers, these produce rough surfaces and a matt appearance in the layers obtained in this way.

There is therefore still a need for pale, conductive pigments which result, even in thin layers, in sufficiently high electrical conductivity when used in a low concentration and in a smooth, optically attractive appearance.

The object of the present invention is therefore to provide an electrically conductive pigment based on a flake-form substrate which can be used in a broad range, results in a good dissipative capacity in the application medium, even when used in a low concentration, ensures both the desired electrically conductive behaviour and also a smooth surface, even in thin layers, has a high hiding power and can be prepared by a simple, inexpensive process.

A further object of the present invention consists in providing a process for the preparation of the said pigments.

In addition, an additional object of the present invention consists in indicating the use of the said pigments.

It has now been found, surprisingly, that the object of the present invention can be achieved by employing electrically conductive pigments which are based on dielectric, flake-form support materials and are provided with an electrically conductive coating and in which the proportion of fine particles in the flake-form substrates and thus also the proportion of fine particles in the electrically conductive pigments is specifically set very high.

The object of the present invention is therefore achieved by an electrically conductive pigment which comprises a dielectric flake-form substrate and an electrically conductive layer surrounding the substrate, where the pigment has a volume average particle size $d_{95}$<25 μm and the ratio of the volume average particle size $d_{95}$ to a volume average size of the pigment $d_5$ is greater than 5.

The object of the present invention is likewise achieved by a process for the preparation of the electrically conductive pigment mentioned above, in which a powder comprising dielectric flake-form substrates which has a volume average particle size $d_{95}$<25 μm and in which at least 5 percent by volume of the powder have a particle size <5 μm is coated in an aqueous suspension optionally with one or more dielectric layers, and finally with an electrically conductive layer.

In addition, the object of the present invention is also achieved by the use of the said electrically conductive pigment in paints, coatings, printing inks, plastics, coating compositions, sensors, security applications, for laser marking, in floorcoverings, films, formulations, ceramic materials, glasses or papers, in particular for antistatic finishing thereof or the establishment of electrical dissipative capacity.

The present invention accordingly relates to electrically conductive pigments which have a dielectric, flake-form substrate and an electrically conductive layer surrounding the substrate. In addition, they also have a volume average particle size $d_{95}$ of less than 25 μm, where the ratio of the $d_{95}$ value determined in this way to a size of the pigments which represents the volume average $d_5$ value is greater than 5.

In an advantageous embodiment of the present invention, the volume average particle size of the electrically conductive pigments $d_{95}$ is less than 15 μm. The ratio $d_{95}/d_5$ here is likewise greater than 5.

The particle size of the pigment according to the invention is regarded as being the volume average particle size, determined via a particle size distribution curve, which represents the $d_{95}$ value of the particle size distribution of a powder bed of the pigment. $d_{95}$ here means that 95 percent by volume of all pigment particles measured have a size below this value.

Correspondingly, the $d_5$ value is determined, which states that 5 percent by volume of all pigment particles measured have a particle size below this value.

In accordance with the invention, at least 5 percent by volume of the pigment particles of a powder bed of the pigment according to the invention have a nominal particle size of <5 μm.

In accordance with the invention, the ratio of the measurement quantities $d_{95}/d_5$ is >5, preferably >7, and can be up to 15.

A ratio of the measurement quantities $d_{95}/d_5$ of greater than 5 indicates a high proportion of fine particles in the particle size distribution and thus a broad particle size distribution of the pigments according to the invention. An increased proportion of fine particles was hitherto regarded as a disadvantage in accordance with the teachings of the prior art, since it results in high scattering behaviour of the pigments in the application medium and is thus not advantageous for transparent coatings.

However, it has surprisingly been found in accordance with the present invention that, in the case of a particle size of <25 μm, which is low anyway, and in application media which do not require high transparency, a high proportion of fine particles in flake-form electrically conductive pigments advantageously results in a sufficiently high dissipative capacity being achievable in the application medium even in the case of low layer thicknesses and in the case of a simultaneously low pigment mass concentration.

For determination of the particle size and particle size distribution, direct measurement and counting of pigment particles under a microscope can be carried out in the simplest manner. However, an automatic indirect method for determination of the particle size is preferably employed, such as, for example, sedimentation with the aid of a sedigraph (Stokes law) or in particular a method for laser diffraction, with the aid of which not only the nominal size of individual particles, but also the percentage particle size distribution can be determined as standard. Measuring instruments are available for this purpose from various companies, for example a Malvern Mastersizer 2000 or, preferably, an Agilent Technologies Accusizer 780. The particle sizes $d_{95}$ determined in the present invention and the $d_5$ values are determined using an Agilent Technologies Accusizer 780.

In accordance with the present invention, the dielectric, flake-form substrate employed is natural mica flakes, synthetic mica flakes, talc flakes, kaolin flakes, sericite flakes, aluminium oxide flakes, silicon dioxide flakes, glass flakes or mixtures of two or more thereof. Preference is given here to natural mica flakes, synthetic mica flakes, talc flakes, kaolin flakes, sericite flakes, aluminium oxide flakes or mixtures thereof, in particular natural or synthetic mica flakes, in each case alone or in a mixture with talc flakes, kaolin flakes and/or sericite flakes. The mixtures may be present here in any desired ratio in the range from 1:99 to 99:1, preferably from 10:90 to 90:10, and in particular from 30:70 to 70:30.

Flakes comprising the materials indicated do not themselves conduct electrical current and are therefore referred to as dielectric.

For the purposes of the present invention, flakes are taken to mean two-dimensional particles which, with their upper and lower sides, have two surfaces approximately parallel to one another whose principal axes have significantly greater values on the surface (dimension in length and width) than the separation between the surfaces (thickness). The flake shape is characterised by the form factor, i.e. the ratio of the principal axis to the thickness. The substrates employed in accordance with the invention have form factors of greater than 5, preferably greater than 10 and in particular greater than 20. In the case of the broad particle size distribution aimed at for the electrically conductive pigments according to the invention, it goes without saying that not only the particle size distribution, but also the form factor of the pigment substrates varies in a broad range within the said values. Thus, the pigments which, with particle sizes <5 μm, form the finely particulate component of the pigment bed tend to have a lower form factor than the pigments which have a particle size of 10, 15 or 20 μm.

The fixing of the particle size of the electrically conductive pigments according to the invention also fixes the volume average particle size $d_{95}$ for the dielectric pigment substrates at <25 µm, preferably <15 µm. The same applies to the form factors of the electrically conductive pigments, which are in the same range as the form factors indicated above for the substrates.

In general, the choice of the substrate geometry determines the particle size, particle size distribution and form factor of the resultant electrically conductive pigments. For this reason, particular attention should be paid to the choice of substrates. In particular, dielectric substrates prepared by fine grinding and classification are used. Such substrates are generally commercially available inexpensively and are frequently used as fillers or as substrates for effect pigments. In contrast to high-quality fillers or substrates for effect pigments, in the case of which importance is usually attached to a low particle size distribution, the finely particulate components are in accordance with the invention not separated off in the case of the substrate flakes obtained by grinding and classification, but instead left in the substrate powder or even added additionally if the proportion of fine particles in the ground substrate powder were to prove too low. However, since the influence of grinding and classification processes on the particle geometry of flake-form pigments is generally known to the person skilled in the art, it is in most cases sufficient to control the grinding and classification process in an expert manner in such a way that the proportion of fine particles in the ground material is sufficiently high to meet the proviso of the present invention.

The electrically conductive pigment according to the invention has an electrically conductive layer on the flake-form dielectric substrate. This electrically conductive layer represents the outermost layer of the pigment.

In principle, all materials having sufficiently high electrically conductive properties which can be deposited on the said substrates in a simple process with virtually homogeneous layer composition and uniform layer thickness are suitable as electrically conductive materials for the electrically conductive layer. Doped metal oxides are preferably employed, where the electrically conductive layer may comprise or consist of one or more thereof.

The metal oxides are preferably tin oxide, zinc oxide, indium oxide and/or titanium oxide, preferably tin oxide, indium oxide and/or zinc oxide. The said metal oxides are in doped form in the conductive layer, where the doping can be carried out with gallium, aluminium, indium, thallium, germanium, tin, phosphorus, arsenic, antimony, selenium, tellurium, molybdenum, tungsten and/or fluorine. Individual dopants of those mentioned, but also combinations thereof, may be present in the conductive layer. Preference is given to the use of aluminium, indium, tungsten, tellurium, fluorine, phosphorus and/or antimony for doping the metal oxides. The proportion of the dopants in the conductive layer can be 0.1 to 30% by weight, preferably in the range from 2 to 15% by weight. In a particularly preferred embodiment, doped tin oxides are employed as conductive layer. These are preferably doped with indium, tungsten, tellurium, fluorine, phosphorus and/or antimony. Particular preference is given to the use of antimony-doped tin oxide, antimony- and tellurium-doped tin oxide or tungsten-doped tin oxide. However, tin-doped indium oxide, aluminium-doped zinc oxide or fluorine-doped tin oxide can advantageously also be employed. The use of antimony-doped tin oxide is most preferred. The tin to antimony ratio in this preferred combination can be 4:1 to 100:1, the ratio is preferably 8:1 to 50:1. Lower antimony contents adversely affect the conductivity, whereas higher antimony contents do not bring any further gains in the electrically conductive or optical properties of the pigments.

The proportion of the electrically conductive layer, based on the flake-form substrate, can be 30 to 120% by weight and is preferably 50 to 80% by weight. If antimony-doped tin oxide is employed as material for the conductive layer, the antimony content is preferably 1 to 20 mol %, and particularly preferably 5 to 15 mol %, based on the total amount of antimony oxide and tin oxide.

The electrically conductive layer has a layer thickness of 10 nm to 200 nm, preferably 20 nm to 50 nm. In general, the electrically conductive layer is so thin that the geometrical shape and the aspect ratio of the substrates in the electrically conductive pigment are substantially retained.

In accordance with the invention, at least one dielectric layer, which is single- or multilayered and consists of a dielectric layer having a refractive index n≥1.8 and/or a dielectric layer having a refractive index n<1.8, may also be located between the substrate and the electrically conductive layer.

Dielectric layers of this type, which are generally metal-oxide layers, can be applied for the purposes of chemical separation of substrate and conductive layer and act as barrier layer, but can if necessary also contribute to the colouring of the pigment through interference and/or inherent colour.

The number and layer thickness of this layer or these layers must be selected here in such a way that the total thickness of the electrically conductive pigments according to the invention does not consequently increase to the extent that they can no longer be employed in thin coatings, which themselves have layer thicknesses of only about 5 to 20 µm. The number of dielectric interlayers will therefore generally not exceed three and will preferably be zero or one. Their total thickness should not exceed 200 nm, preferably 100 nm, in particular 50 nm.

The dielectric layer(s) comprising a material having a refractive index n≥1.8 (high-refractive-index layers) is (are) layers which preferably consist of $TiO_2$, titanium oxide hydrate, titanium suboxides, $SnO_2$, $ZrO_2$, $Cr_2O_3$ and/or mixed phases thereof. These materials are either colourless or have an inherent colour owing to inherent absorption. Particular preference is given to $TiO_2$, titanium oxide hydrate and $SnO_2$. Especial preference is given to $TiO_2$ and titanium dioxide hydrate. Since these have a particularly high refractive index due to prior coating with tin oxide, particular preference is also given to mixed phases of tin oxide with $TiO_2$ and titanium dioxide hydrate, which in these cases form from the small amounts of tin oxide and the subsequent layer comprising $TiO_2$ and/or titanium oxide hydrate.

The dielectric layer(s) comprising a material having a refractive index n<1.8 (low-refractive-index layers) preferably consist of $SiO_2$, silicon oxide hydrate, $Al_2O_3$, aluminium oxide hydrate, of mixed phases thereof or of $MgF_2$. Particular preference is given to $SiO_2$ and/or silicon oxide hydrate.

If high- and low-refractive-index dielectric materials are to be applied as interlayers between substrate and electrically conductive layer, the sequence of the layers to be applied to the substrate depends on the respective optical requirements. The requisite knowledge in this respect is readily available to the corresponding person skilled in the art and therefore need not be explained in greater detail here.

The electrically conductive pigments according to the invention have a pale-grey powder colour and are suitable, in particular, for pale and opaque coatings, in particular primer coats, which are applied to substrates in a low layer thickness and should have stable, good dissipation behaviour.

The present invention also relates to a process for the preparation of the said electrically conductive pigments, in which a powder comprising dielectric flake-form substrates, which has a volume average particle size $d_{95}$<25 µm and in which at least 5 percent by volume of the powder have a particle size <5 µm, is coated in an aqueous dispersion optionally with one or more dielectric layers, and finally with an electrically conductive layer.

The dielectric substrates employed here are the substrates already mentioned above, which are selected from natural mica flakes, synthetic mica flakes, talc flakes, kaolin flakes, sericite flakes, aluminium oxide flakes, silicon dioxide flakes, glass flakes or mixtures of two or more thereof. Particular preference is given to the use of natural or synthetic mica flakes, in each case alone or in a mixture with talc flakes, kaolin flakes and/or sericite flakes.

The choice of the dimensions of the substrate flakes have already been described above. In accordance with the invention, the substrates are prepared by grinding and classification. Suitable grinding methods for this purpose are, in particular, those of dry grinding or also grinding in aqueous suspension, for example using a pan grinder, a pin mill or a ball mill.

The fines content has preferably already been checked as early as the substrates. This can be carried out, as already described above, by a direct measurement and counting method under a microscope, but is, in particular, carried out either by a sedimentation method or with the aid of a laser diffraction method. Particular preference is given in accordance with the invention to a measurement method for particle size and particle size distribution with the aid of an Agilent Technologies Accusizer 780 in standard mode.

If the desired content of finely particulate substrates is too low, an additional grinding operation or the admixing of powder of suitable composition which is already in finely divided form can optionally be selected.

The optional coating with dielectric layers can be carried out by the methods which are generally conventional in the preparation of effect pigments. Suitable for this purpose are, in particular, wet-chemical methods based on inorganic starting materials, as described, for example, in the specifications DE 14 67 468, DE 19 59 998, DE 20 09 566, DE 22 14 545, DE 22 15 191, DE 22 44 298, DE 23 13 331, DE 25 22 572, DE 31 37 808, DE 31 37 809, DE 31 51 355, DE 32 11 602 and DE 32 35 017. Methods of this type belong to the standard knowledge of the person skilled in the art of pigments.

For the coating with an electrically conductive layer, a wet-chemical method with inorganic starting materials is advantageously likewise selected. Methods of this type are known per se and are described, for example, in EP 139 557.

Particular preference is given to the application of an electrically conductive layer of antimony-doped tin oxide. The desired homogeneous distribution of tin and antimony in the conductive layer can be achieved by metering in salts of tin and antimony, for example chlorides, either together in a solution or in two separate solutions continuously and in a pre-determined mixing ratio of the aqueous suspension of the substrate at a suitable pH in the range from 1 to 5 and a suitable temperature from 50 to 90° C. at such a rate that hydrolysis and deposition on the flake-form substrate takes place directly in each case.

After completion of the coating on achieving the desired layer thickness, the pigments are separated off from the suspension, optionally washed and dried and generally calcined at temperatures in the range from 400° C. to 1100° C., preferably from 700° C. to 950° C.

In order to improve the conductivity, the pigments can optionally also be calcined under an inert-gas atmosphere or under a reducing atmosphere, for example under forming gas. This process is advantageous, for example, in the case of tungsten-doped tin oxide.

In the case where, after the coating with an electrically conductive layer, the resultant electrically conductive pigments no longer have the requisite broad particle size distribution due to aggregation or the like, a subsequent further grinding process can be carried out or suitable finely particulate substrates which have already been coated with an electrically conductive layer can be added.

The present invention also relates to the use of the pigments according to the invention described above in paints, coatings, printing inks, plastics, coating compositions, sensors, security applications, for laser marking, in floorcoverings, films, formulations, ceramic materials, glasses or papers.

In these areas of application, the pigments according to the invention are preferably employed in order to achieve an adequate dissipative capacity or an antistatic finish. It is particularly advantageous here that the concentration of the pigments according to the invention, which is in the range from 25 to 60%, based on the solids content of the application medium (pigment mass concentration), in the application medium, i.e., in particular, in paints, coatings, printing inks, plastics, coating compositions, floorcoverings, films and ceramic materials, results in reliable antistatic properties in the case of thin coatings having a layer thickness in the region below 20 µm from a use concentration as low as 35%. Thus, surface resistance values of 10E+04 ohm or less can be achieved in thin coatings having a layer thickness of 15 to 20 µm on plastic parts at a pigment mass concentration in the range from 35 to 45%, while surface resistance values of 10E+06 ohm are achieved in printed layers with a thickness of 5 µm on coated paper at the same concentration.

The proportion of fine particles in the electrically conductive pigments contributes to the formation of stable conduction paths due to electrical bridging of larger electrically conductive particles. This shifts the percolation threshold in the application medium to lower use concentrations, enabling coatings or mouldings having a lower pigment mass concentration to be formulated. Besides improved processing properties of, in particular, coating compositions and paints, coatings or printing inks, the flake-form pigments are able to align well in the layer plane in the application medium, meaning that they do not project beyond the layer surface, even if their particle size is above the layer thickness. In addition, the presence of finely divided flake-form particles does not result in de-alignment of relatively large particles, as can be observed, by contrast, in the case of the admixing of spherical particles with electrically conductive pigment mixtures. The layers which can be achieved with the pigment according to the invention therefore have a smooth surface which has virtually no or no matting. They are suitable, in particular, for use in conductive primer coats for high-quality ESTA finishes and for conductive prints. In addition, they are also advantageously suitable as additives for laser-markable and laser-weldable plastics.

On use of the pigments according to the invention in paints and coatings, all areas of application known to the person skilled in the art are possible, such as, for example, powder coatings, automobile paints, printing inks for gravure, offset, screen or flexographic printing and paints in outdoor applications. For the preparation of printing inks, a multiplicity of binders, in particular water-soluble, but also solvent-containing types, for example based on acrylates, methacrylates, polyesters, polyurethanes, nitrocellulose, ethylcellulose, polyamide, polyvinyl butyrate, phenolic resins, melamine resins, maleic resins, starch or polyvinyl alcohol, is suitable. The paints can be water- or solvent-based paints, where the choice of the paint constituents is subject to the general knowledge of the person skilled in the art.

The pigments according to the invention can likewise advantageously be employed for the production of conductive plastics and films, for example for conductive films and sheets, plastic containers and mouldings for all applications known to the person skilled in the art which require electrical conductivity. Suitable plastics here are all standard plastics, for example thermosets and thermoplastics. The pigments according to the invention are subject here to the same conditions as conventional pearlescent or interference pigments. Peculiarities of the introduction into plastics are described, for example, in R. Glausch, M. Kieser, R. Maisch, G. Pfaff, J. Weitzel, Perlglanzpigmente [Pearlescent Pigments], Curt Vincentz Verlag, 1996, 83 ff.

The pigments according to the invention are also suitable for the preparation of flowable pigment preparations and dry preparations which comprise one or more pigments according to the invention, optionally further pigments or colorants, binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pearlets, pellets, granules, chips, sausages or briquettes and have particle sizes of about 0.2 to 80 mm.

It goes without saying that the pigments according to the invention can be employed in a very wide variety of application media, if necessary in a mixture with further organic and/or inorganic colorants and/or electrically conductive materials. The mixing ratios here are not limited in any way so long as the pigment concentration in the medium is sufficiently high in order to achieve the desired electrically conductive properties, but sufficiently low in order not adversely to affect the requisite viscosity or the desired properties.

The present invention will be explained below with reference to examples, which are intended to describe the invention, but not to restrict it.

EXAMPLES

Preparation of the Mica:

Crude mica is finely ground in a pan grinder and classified with the aid of a decanter into various fractions which differ in particle size and particle spectrum. The extremely fine components are separated off from a finely divided mica fraction <15 µm in the decanter.

Example 1

Conductive Pigment Based on Finely Divided Talc and Mica 50 g of Plustalk H05 AW from Mondo Minerals and 50 g of the finely divided mica fraction described above are suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 167 g of a pale-grey pigment powder. The Sn:Sb ratio in the coating is about 85:15. The particle size distribution of the pigment is measured by means of laser diffraction in an Agilent Technologies Accusizer, model 870. The product has a volume-weighted particle size $d_{95}$ of 11.2 µm and a $d_5$ of 1.26 µm. The $d_{95}/d_5$ ratio is 8.9.

Example 2

Conductive Pigment Based on Finely Divided Talc 100 g of Plustalk H 05 AW from Mondo Minerals are suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 165 g of a pale-grey pigment powder. The Sn:Sb ratio in the coating is about 85:15. The particle size distribution of the pigment is measured by means of laser diffraction in an Agilent Technologies Accusizer, model 870. The product has a very high fines content at a volume-weighted particle size $d_{95}$ of 11 µm and a $d_5$ of 1 µm. The $d_{95}/d_5$ ratio is 11.

Example 3

Conductive Pigment Based on Mica 100 g of a mica fraction having a particle size <25 µm are suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 166 g of a pale-grey pigment powder. The Sn:Sb ratio in the coating is about 85:15. The particle size distribution of the pigment is measured by means of laser diffraction in an Agilent Technologies Accusizer, model 870. The product has a volume-weighted particle size $d_{95}$ of 23.5 µm and a $d_5$ of 3.8 µm. The $d_{95}/d_5$ ratio is 6.2.

Example 4

Conductive Pigment Based on Talc and Mica 50 g of Plustalk H 05 AW from Mondo Minerals and 50 g of a mica fraction having a particle size <25 µm are suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 167 g of a pale-grey pigment powder. The Sn:Sb ratio in the coating is about 85:15, the layer thickness of the antimony-doped tin oxide layer is about 25 µm. The particle size distribution of the pigment is measured by means of laser diffraction in an Agilent Technologies Accusizer, model 870. The product has a volume-weighted particle size $d_{95}$ of 9.3 µm and a $d_5$ of 1.4 µm. The $d_{95}/d_5$ ratio is 6.6.

Comparative Example 1

Pigment Based on Mica 100 g of a finely divided mica fraction having a particle size of <15 µm which has been freed from the extremely fine components as described above is suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 800° C. for 30 min., giving 164 g of a pale-grey pigment powder. The Sn:Sb ratio in the coating is about 85:15. The particle size distribution of the pigment is measured by means of laser diffraction in an Agilent Technologies Accusizer, model 870. The product has a volume-weighted particle size $d_{95}$ of 7.2 µm and a $d_5$ of 1.6 µm. The $d_{95}/d_5$ ratio is 4.5.

Comparative Example 2

Pigment Based on Mica and Spherical Quartz Powder 50 g of finely divided quartz flour ($d_{50}$ about 3 µm) and 50 g of the finely divided mica fraction <15 µm described above are suspended in 1900 ml of DI water, and the suspension is adjusted to pH 2.1 using hydrochloric acid. A mixture of 206 g of a 50% by weight aqueous $SnCl_4$ solution, 67 ml of HCl (37% by weight) and 47 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 167 g of a pale-grey pigment powder. The Sn:Sb ratio in the coating is about 85:15. The particle size distribution of the pigment is measured by means of laser diffraction in an Agilent Technologies Accusizer, model 870. The product has a volume-weighted particle size $d_{95}$ of 9.3 µm and a $d_5$ of 1.05 µm. The $d_{95}/d_5$ ratio is 8.9.

Comparative Example 3

Pigment Based on Mica and Spherical Quartz Powder 50 g of finely divided quartz flour ($d_{50}$ about 3 µm) and 50 g of a mica fraction <60 µm are suspended in 1900 ml of DI water, and the suspension is adjusted to pH 2.1 using hydrochloric acid. A mixture of 146 g of a 50% by weight aqueous $SnCl_4$ solution, 67 ml of HCl (37% by weight) and 15 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution, the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 750° C. for 30 min., giving 166 g of a pale-grey pigment powder. The Sn:Sb ratio in the coating is about 92:8. The particle size distribution of the pigment is measured by means of laser diffraction in an Agilent Technologies Accusizer, model 870. The product has a volume-weighted particle size $d_{95}$ of 49.7 µm and a $d_5$ of 3.0 µm. The $d_{95}/d_5$ ratio is 16.6.

Comparative Example 4

Pigment Based on Mica 100 g of a mica fraction <40 µm are suspended in 1900 ml of DI water, and the suspension is adjusted to pH 2.1 using hydrochloric acid. A mixture of 146 g of a 50% by weight aqueous $SnCl_4$ solution, 67 ml of HCl (37% by weight) and 15 g of a 35% by weight aqueous $SbCl_3$ solution is slowly metered continuously into the suspension at 75° C. with stirring. The pH is kept constant by simultaneous regulated addition of sodium hydroxide solution. After addition of the entire amount of the solution (290 ml), the mixture is stirred at 75° C. for a further 30 min., subsequently cooled to room temperature with stirring, and the reaction mixture is adjusted to pH 3. The pigment obtained is filtered off via a suction filter, washed with water, dried at 140° C. and calcined at 800° C. for 30 min., giving 142 g of a pale-grey pigment powder. The Sn:Sb ratio in the coating is about 92:8. The particle size distribution of the pigment is measured by means of laser diffraction in an Agilent Technologies Accusizer, model 870. The product has a volume-weighted particle size $d_{95}$ of 35.1 µm and a $d_5$ of 6.4 µm. The $d_{95}/d_5$ ratio is 5.5.

Evaluation

Testing of the Conductivity in a Lacquer Film:

The pigments of the examples and comparative examples are dispersed in NC lacquer (12% of binder comprising nitrocellulose and butyl acrylate in a solvent mixture). PET films are coated with the lacquer preparations with a lacquer film with a dry layer thickness of 9 μm and a pigment mass concentration of 35% in the dried film.

After drying of the lacquer layers, the dissipation resistance (specific surface resistance) is measured in accordance with DIN 53482 with the aid of a spring-tongue electrode. The measurement voltage is 100V. The results are shown in Table 1. A comparative lacquer film without conductive pigment has a specific surface resistance of $>10^{10}$ ohm.

Characterisation of the Surface Nature:

Lacquer films having the smoothest possible surface are required. The roughness of the respective lacquer film is assessed optically. A lacquer film without conductive pigment which has a very smooth surface is assessed as 10.

The results in Table 1 show that the electrically conductive pigments in accordance with the present invention in thin films result in a smooth surface and a uniform coating and exhibit good conductivity, even at a comparatively low use concentration. In comparison, although pigments of the same structure and of the same composition on mica substrates having a narrow particle size distribution under the given conditions exhibit high coating quality, they do not, however, exhibit a usable electrical conductivity, while pigments having a content of spherical particles and a likewise high fines content result in rough and matt surfaces.

TABLE 1

| Pigment from Example | Substrate | Spec. surface resistance [Kohm] | D(95) [μm] | d(95)/d(5) Accusizer | Surface nature |
|---|---|---|---|---|---|
| 1 (inv.) | Mica + talc | 9.00E+02 | 11.2 | 8.9 | 9 |
| 2 (inv.) | Talc | 3.10E+03 | 11 | 11 | 9 |
| 3 (inv.) | Mica | 2.40E+03 | 23.5 | 6.2 | 8 |
| 4 (inv.) | Mica + talc | 2.00E+02 | 9.3 | 6.6 | 9 |
| Comp. 1 | Mica | 5.00E+10 | 7.2 | 4.5 | 8 |
| Comp. 2 | Mica + quartz | 2.25E+04 | 9.3 | 8.9 | 4 |
| Comp. 3 | Mica + quartz | 2.08E+06 | 49.7 | 16.6 | 2 |
| Comp. 4 | Mica | 5.00E+10 | 35.1 | 5.5 | 6 |

The invention claimed is:

1. Electrically conductive pigments, comprising a dielectric flake-form substrate and an electrically conductive layer surrounding the substrate, which has a volume average particle size $d_{95}$<25 μm and a ratio of a volume average particle size $d_{95}$ to a volume average size of the pigments $d_5$ is greater than 5, and wherein at least 5 percent by volume of a powder bed of the electrically conductive pigments have a nominal particle size of <5 μm.

2. Electrically conductive pigments according to claim 1, wherein the substrate is selected from the group consisting of natural mica flakes, synthetic mica flakes, talc flakes, kaolin flakes, sericite flakes, aluminium oxide flakes, silicon dioxide flakes, glass flakes of mixtures of two or more thereof.

3. Electrically conductive pigments according to claim 1, wherein the electrically conductive layer consists of one or more doped metal oxides.

4. Electrically conductive pigments according to claim 3, wherein the doped metal oxide is tin oxide, zinc oxide, indium oxide and/or titanium oxide which is doped with gallium, aluminium, indium, thallium, germanium, tin, phosphorus, arsenic, antimony, selenium, tellurium, molybdenum, tungsten and/or fluorine.

5. Electrically conductive pigments according to claim 3, wherein the electrically conductive layer consists of a doped tin oxide.

6. Electrically conductive pigments according to claim 3, wherein the electrically conductive layer consists of antimony-doped tin oxide, wherein the antimony content is 5 to 15 mol % based on the total amount of antimony oxide and tin oxide.

7. Electrically conductive pigments according to claim 1, wherein at least one dielectric layer is located between the flake-form substrate and the electrically conductive layer.

8. Electrically conductive pigments according to claim 1, wherein the ratio of the volume average particle size $d_{95}$ to the volume average size of the pigments $d_5$ is greater than 7.

9. Electrically conductive pigments according to claim 1, wherein the pigment has a volume average particle size $d_{95}$ of <15 μm.

10. A process for preparing electrically conductive pigments according to claim 1, comprising coating a powder comprising dielectric flake-form substrates which has a volume average particle size $d_{95}$<25 μm and in which at least 5 percent by volume of the powder have a particle size <5 μm in an aqueous suspension
optionally with one or more dielectric layers, and finally with an electrically conductive layer.

11. The process according to claim 10, wherein the dielectric substrates are natural mica flakes, synthetic mica flakes, talc flakes, kaolin flakes, sericite flakes, aluminium oxide flakes, silicon dioxide flakes, glass flakes or mixtures of two or more thereof.

12. The process according to claim 10, wherein the powder comprising dielectric flake-form substrates is coated with an electrically conductive layer comprising one or more doped metal oxides.

13. A product selected from the group consisting of paints, coatings, printing inks, plastics, coating compositions, sensors, security applications, far laser marking, floor coverings, films, ceramic materials, glasses and papers, comprising electrically conductive pigments according to claim 1.

14. The product according to claim 13, which is selected from the group consisting of paints, coatings, printing inks, plastics, coating compositions, floor coverings, films and ceramic materials, and having a pigment mass concentration of 25 to 60%.

15. Electrically conductive pigments according to claim 1, which have a surface resistance value of 10E+04 ohm or less when measured in a coating having a layer thickness of 15 to 20 μm on a plastic part at a pigment mass concentration of 35 to 45%.

16. Electrically conductive pigments according to claim 1, wherein the ratio of the volume average particle size $d_{95}$ to a volume average size of the pigments $d_5$ is greater than 5 and up to 15.

17. Electrically conductive pigments according to claim 16, wherein the pigment has a volume average particle size $d_{95}$ of <15 μm.

18. Electrically conductive pigments according to claim 16, wherein the electrically conductive layer consists of antimony-doped tin oxide, wherein the antimony content is 5 to 15 mol % based on the total amount of antimony oxide and tin oxide.

19. Electrically conductive pigments according to claim 16, which have a surface resistance value of 10E+04 ohm or less when measured in a coating having a layer thickness of 15 to 20 μm on a plastic part at a pigment mass concentration of 35 to 45%.

20. Electrically conductive pigments according to claim 1, wherein the ratio of the volume average particle size $d_{95}$ to a volume average size of the pigments $d_5$ is 7 to 11.

* * * * *